United States Patent
Britton, Jr. et al.

[11] Patent Number: 5,862,170
[45] Date of Patent: Jan. 19, 1999

[54] TEMPERATURE MEASUREMENT METHOD USING TEMPERATURE COEFFICIENT TIMING FOR RESISTIVE OR CAPACITIVE SENSORS

[75] Inventors: Charles L. Britton, Jr., Alcoa; M. Nance Ericson, Knoxville, both of Tenn.

[73] Assignee: Lockheed Martin Energy Research Corporation, Oak Ridge, Tenn.

[21] Appl. No.: 744,357

[22] Filed: Nov. 6, 1996

[51] Int. Cl.⁶ .............................. G01K 7/18; G01K 7/22; G01K 7/34
[52] U.S. Cl. .......................... 374/183; 374/184; 374/170; 307/651; 327/512
[58] Field of Search ...................................... 374/183, 170, 374/171, 184; 327/512; 307/651

[56] References Cited

U.S. PATENT DOCUMENTS

| | | | |
|---|---|---|---|
| 3,914,539 | 10/1975 | Hashimoto | 374/100 |
| 4,078,201 | 3/1978 | Buser | 374/163 |
| 4,676,663 | 6/1987 | Tehon | 374/117 |
| 5,056,048 | 10/1991 | Seperant | 374/170 |
| 5,118,200 | 6/1992 | Kirillov et al. | 374/120 |

FOREIGN PATENT DOCUMENTS 1390516  4/1988  U.S.S.R. ................. 374/170

Primary Examiner—Diego F. F. Gutierrez
Assistant Examiner—Andrew Hirshfeld
Attorney, Agent, or Firm—James M. Spicer

[57] ABSTRACT

A method and apparatus for temperature measurement especially suited for low cost, low power, moderate accuracy implementation. It uses a sensor whose resistance varies in a known manner, either linearly or nonlinearly, with temperature, and produces a digital output which is proportional to the temperature of the sensor. The method is based on performing a zero-crossing time measurement of a step input signal that is double differentiated using two differentiators functioning as respective first and second time constants; one temperature stable, and the other varying with the sensor temperature.

14 Claims, 5 Drawing Sheets

TEMPERATURE MEASUREMENT METHOD USING TEMPERATURE COEFFICIENT TIMING FOR RESISTIVE OR CAPACITIVE SENSORS

This invention was made with Government support under contract DE-AC05-96OR22464 awarded by the U.S. Department of Energy to Lockheed Martin Energy Research Corporation, and the Government has certain rights in this invention.

BACKGROUND OF THE INVENTION

1. Field of the Invention

This invention relates generally to a new method for temperature measurement that provides a direct digital temperature output, and is especially suited for low cost, low power, moderate accuracy implementation. More particularly, it relates to a measurement method for use with a sensor whose resistance or capacitance varies in a known manner with temperature. The measurement circuit is a temperature-to-digital converter which performs a zero-crossing time measurement of a step input signal that has been double differentiated using two time constants.

2. Description of Related Art

Resistive elements such as thermistors, resistive temperature devices and sensistors are routinely used to measure temperature. Two temperature measurement methods widely used with resistive sensors involve either: (1) applying a high precision current and measuring the resultant voltage with an correspondingly high precision voltage-sensitive analog-to-digital converter (ADC); or (2) applying a high precision voltage and measuring the resultant current with an equally precise current-sensitive analog-to-digital converter. Whichever measurement method is used, both require the use of not one but two functional circuit modules with approximately equal precision to produce a digital representation of temperature from the resistance-based temperature sensor. This requirement for two high precision circuit modules is a limitation of the present art heretofore unaddressed.

Temperature monitoring is often performed in situations where it is difficult to environmentally control the measurement electronics. In some automotive applications, for example, measurement electronics are required to function from −40° C. to 150° C. while the sensor temperature may reach combustion levels. Both aviation and oil well drilling present similarly challenging temperature measurement difficulties. Temperature measurement in situations like these where the measurement electronics and sensor temperature vary independently has been difficult. The traditional temperature measurement methods above, which rely on maintaining highly accurate and stable circuit functions over wide temperature ranges, have been at a disadvantage.

We present a new method for temperature measurement whose accuracy relies on the ability to generate an accurate timebase. A timebase function can be easily implemented in a single circuit module. Our method makes possible a moderate accuracy temperature measurement implementation using ASIC technology that can be miniaturized, battery powered, and can result in a very low cost measurement method. It eliminates the aforementioned problems associated with prior methods in that they require more circuit elements that have to be precisely controlled, and such control has been very difficult to achieve over desired temperature ranges.

Therefore, it is a first object of the present invention to provide a new temperature measurement method where the precision of measurement relies on a single high precision component in the form of a robust timebase generator.

A second object is to provide a new temperature measurement method based on the interaction of two time constants.

A third object is to provide a temperature-to-digital converter that gives direct temperature-to-digital conversion, and eliminates temperature-related errors associated with analog-to-digital conversion methods.

A fourth object is to eliminate the need for absolute voltage or current sources required in traditional sensistor, thermistor and resistive temperature device measurement circuits.

A fifth object is to eliminate the need for high gain, temperature-stable amplifiers in temperature measurements based on thermocouple sensors.

A sixth object is to provide a new temperature measurement method that is insensitive to the amplitude or gain of the signal applied to the sensor, thereby eliminating electronics drift problems associated with amplitude or gain instability.

A seventh object is to eliminate dc offset errors associated with electro-static discharge protection structures and other dc currents that become particularly significant at elevated temperatures.

An eighth object is to provide a new temperature measurement method for use with both resistance-based temperature sensors and capacitance-based temperature sensors.

Further and other objects and advantages of the present invention will become apparent from the description contained herein.

SUMMARY OF THE INVENTION

The temperature measuring method of the invention is a method for measuring the temperature of a temperature dependent sensor comprising the steps of generating a step signal; differentiating the step signal with a first time constant means to produce a differentiated pulse, the first time constant means being independent of temperature; differentiating the differentiated pulse with a second time constant means to produce a doubly-differentiated pulse having a zero crossing, the second time constant means including the temperature dependent sensor; detecting the zero crossing with a comparator means; starting a digital counting means at the instant the step signal is generated; and stopping the digital counting means at the instant the zero crossing occurs; whereby the digital output of the digital counting means is a function of the temperature of the temperature dependent sensor.

The temperature measuring apparatus of the invention for carrying out the steps of the method comprises a means for generating a step input; a first time constant means independent of temperature for differentiating the step input and obtaining a differentiated pulse; a second time constant means dependent on temperature for differentiating the differentiated pulse to obtain a doubly-differentiated pulse having a zero crossing; a comparator means for detecting the zero crossing and providing a stop signal thereupon; an n-bit counter operable to begin counting at the instant the step input is generated, and capable of being stopped at the instant the stop signal is received from the comparator means; and a timebase for providing a fixed clock to the n-bit counter; whereby the digital output of the n-bit counter is a function of the temperature of the second time constant means.

For a better understanding of the present invention, together with other and further objects, advantages, and capabilities thereof, reference is made to the following disclosure and appended claims in connection with the above-described drawings.

DESCRIPTION OF THE PREFERRED EMBODIMENTS

Figure 1:
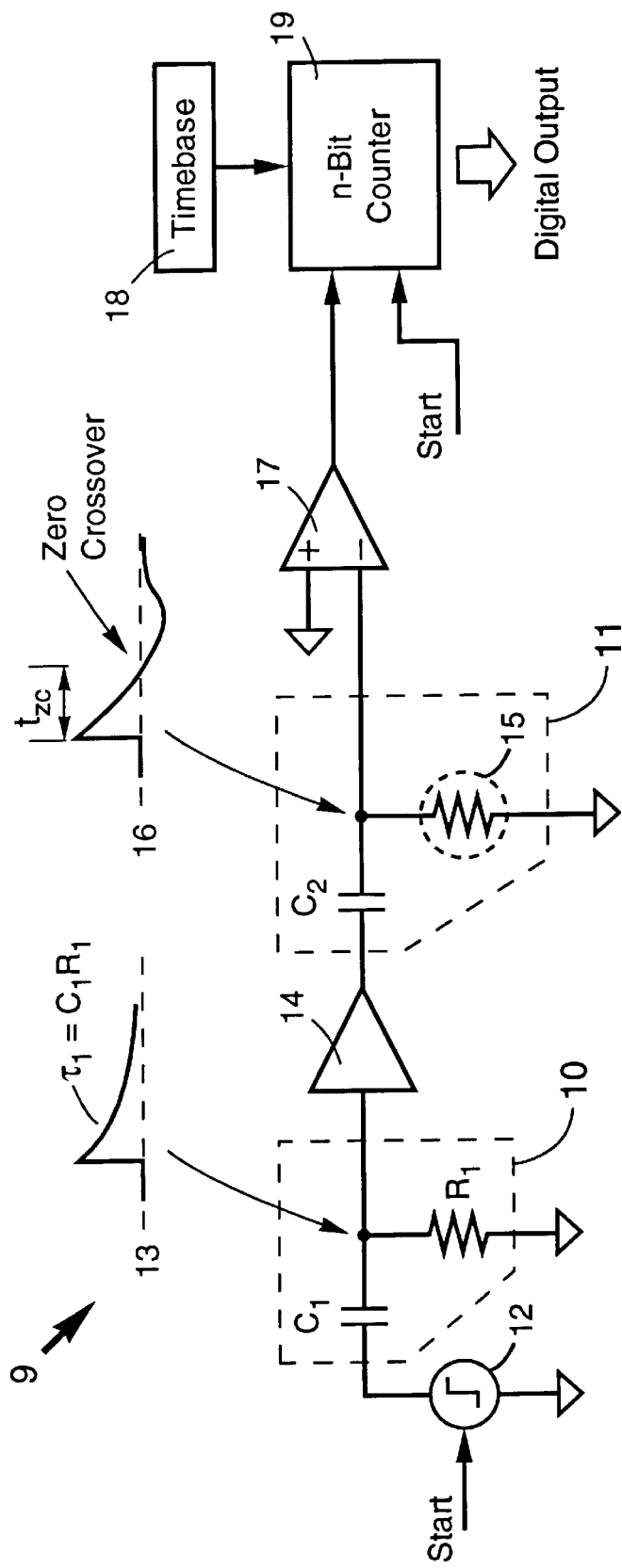
FIG. 1 is a schematic circuit diagram in accordance with a preferred embodiment of the invention, and illustrating the double differentiation and zero crossover aspects therein.

FIG. 1 shows a schematic circuit diagram of the temperature measuring apparatus 9 of this invention. The circuit is used in conjunction with a temperature dependent resistive element (sensor) 15 with a known resistance temperature coefficient. The sensor can be any linear or nonlinear temperature dependent resistive device, and includes thermistors, sensistors, resistive temperature devices, etc.

In FIG. 1, a step signal source 12 is triggered upon receiving a start signal. The start signal causes the step signal source 12 to input a rising edge (usually but not always a step voltage, a step current could be used as well) to the circuit. A capacitor $C_1$ and resistor $R_1$ comprise a first differentiator 10 that differentiates the rising edge (or step voltage) from the step signal source 12 to produce the differentiated pulse (waveform) illustrated at 13 in FIG. 1. The first differentiator 10 thus functions as a temperature-stable time constant $\tau_1$ equal to the product of $R_1$ and $C_1$.

The temperature dependent resistive element (sensor) 15, together with a capacitor $C_2$, comprise a second differentiator 11. Differentiator 11 functions as a temperature-dependent time constant $\tau_2$, which is equal to the product of the resistance of sensor 15 and $C_2$. It differentiates the output of the first differentiator 10 to produce the doubly-differentiated pulse (or waveform) shown at 16 in FIG. 1. The significant feature of waveform 16 is that it is bipolar, i.e., has a zero crossover point that is utilized by the invention.

A buffer amplifier 14 with a very high input impedance and very low output impedance may be located between the two differentiators 10, 11 to separate the poles and zeros generated by the two time constant generating networks $C_1$ and $R_1$, and $C_2$ and sensor 15, respectively. By this means, the two differentiators are kept fully independent to allow the zero crossover point to be achieved properly.

A comparator 17 is connected to receive the doubly-differentiated voltage pulse 16 at its signal input, while its reference input is connected to common. Comparator 17 thus functions as a zero crossing detector to provide an output signal the instant the zero crossing occurs (see waveform 16 in FIG. 1).

Completing the circuit, a fixed frequency timebase 18 is connected to an n-bit counter 19. The timebase 18 sets the rate at which the n-bit counter 19 counts, which is a fixed number of pulses per second. The n-bit counter 19 is connected to receive the same start signal as the step signal source 12. By this means, the counter 19 is started at the same instant the rising edge is generated. The counter 19 runs until stopped by the comparator 17's sensing the zero crossing and providing its output signal to the counter 19. When stopped, the counter 19 delivers its digital output, which is the quantity of interest and the final output of the circuit 9. The digital output is proportional to the time from the start signal to the time to zero crossing.

Because the digital counter output is proportional to the zero crossing time, it is proportional to a ratio of logarithms of the temperature of the sensor 15. A unique feature of the invention is that because the value in counter 19 is a direct digital representation of the sensor 15 temperature, no conversion from an analog value is required.

In mathematical terms, the waveform 16 resulting from the double differentiation produces a zero-crossing time described by the following relationship:

$$t_{ZC} = \frac{1}{\left(\frac{1}{\tau_1} - \frac{1}{\tau_2}\right)} \ln\left(\frac{\tau_2}{\tau_1}\right)$$

where $t_{ZC}$ is the time to zero crossing, and $\tau_1$ and $\tau_2$ are the time constants associated with $R_1$ and $C_1$, and $C_2$ and sensor 15, respectively.

It will also be noted that Equation 1 demonstrates a dependence on $R_1$, $C_1$, and $C_2$ in addition to the sensor 15. The temperature dependence of these devices can be eliminated by the use of low temperature coefficient precision resistors and capacitors. The prototype circuit has operated stably in a temperature range from 25° C. to 200° C.

The logarithmic nature of the measurement method makes it appropriate for wide-range measurements across several decades of resistance change.

Figure 2A:
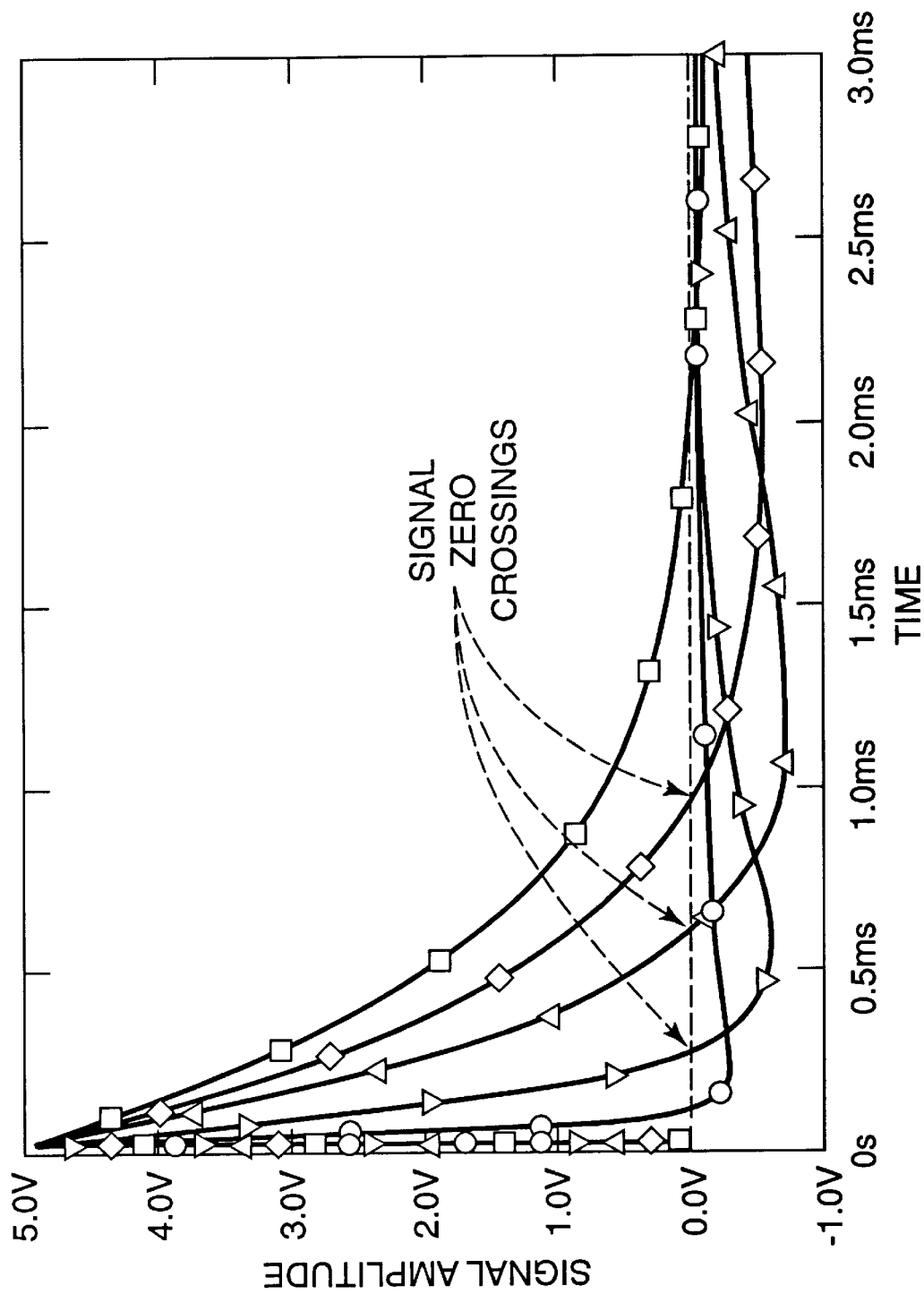
FIG. 2a is a graph showing zero crossings for fixed $\tau_1$ and varying $\tau_2$ in a buffered embodiment of the invention.
Figure 2B:
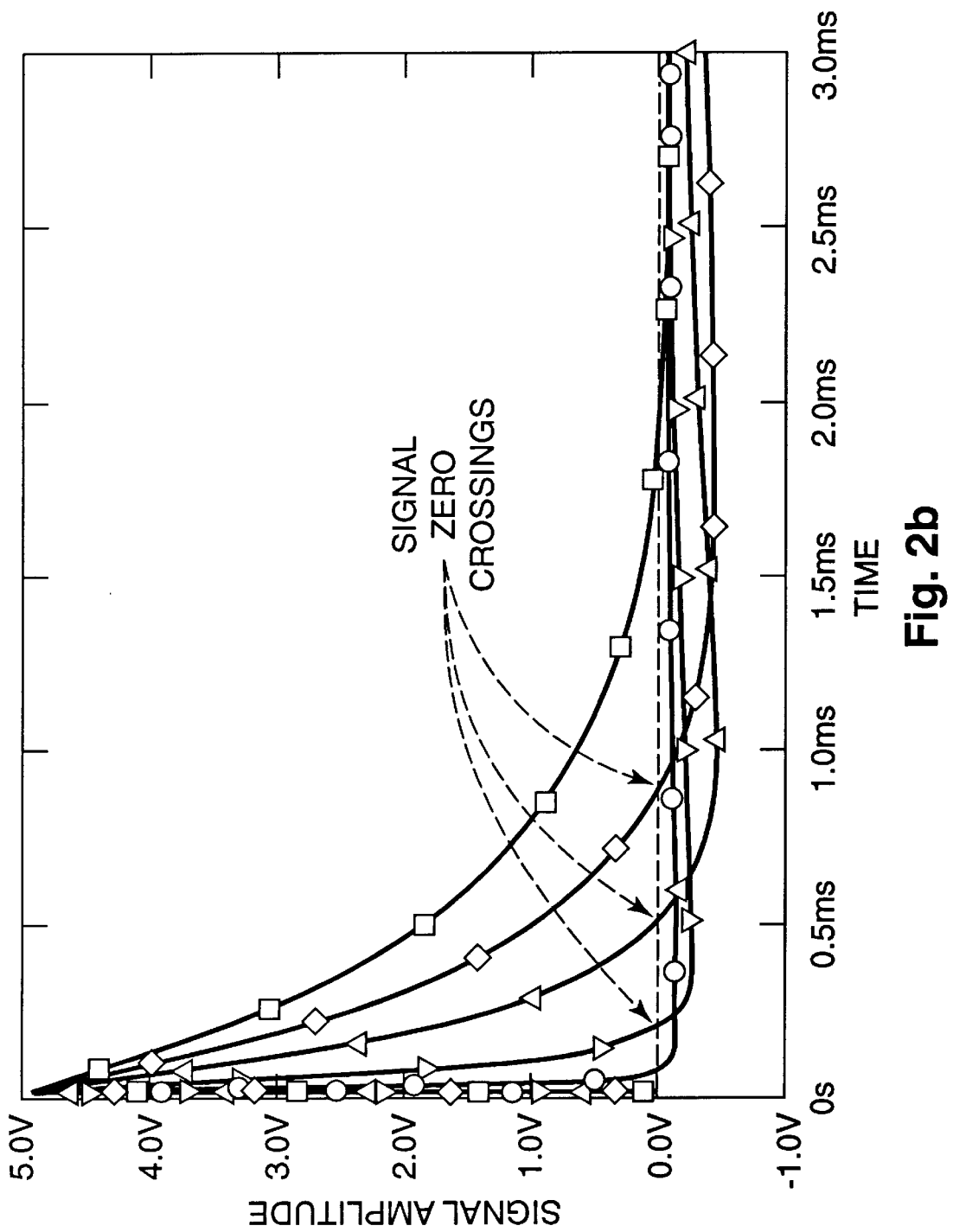
FIG. 2b is a similar graph showing zero crossings for fixed $\tau_1$ and varying $\tau_2$ in an unbuffered version embodiment of the invention.

FIGS. 2a and 2b demonstrate the effect of the doubly differentiated pulse crossing the baseline (zero crossing) after being processed by the two time constant generating networks. FIG. 2a is a graph showing zero crossings for fixed $\tau_1$ and varying $\tau_2$ in the buffered embodiment of the invention described hereinabove. FIG. 2b is a similar graph showing zero crossings for fixed $\tau_1$ and varying $\tau_2$ in an unbuffered embodiment of the invention. Note that as $\tau_2$ gets progressively larger, the zero crossing occurs at a progressively longer time with respect to the beginning of the pulse. FIG. 2a represents the use of the buffer amplifier 14 to isolate the two time constant generating networks while FIG. 2b represents the results obtained when no buffer amplifier 14 is used. While both realizations result in a successful measurement method, the embodiment in FIG. 2a produces a more pronounced and more easily analytically expressed function.

Figure 2C:
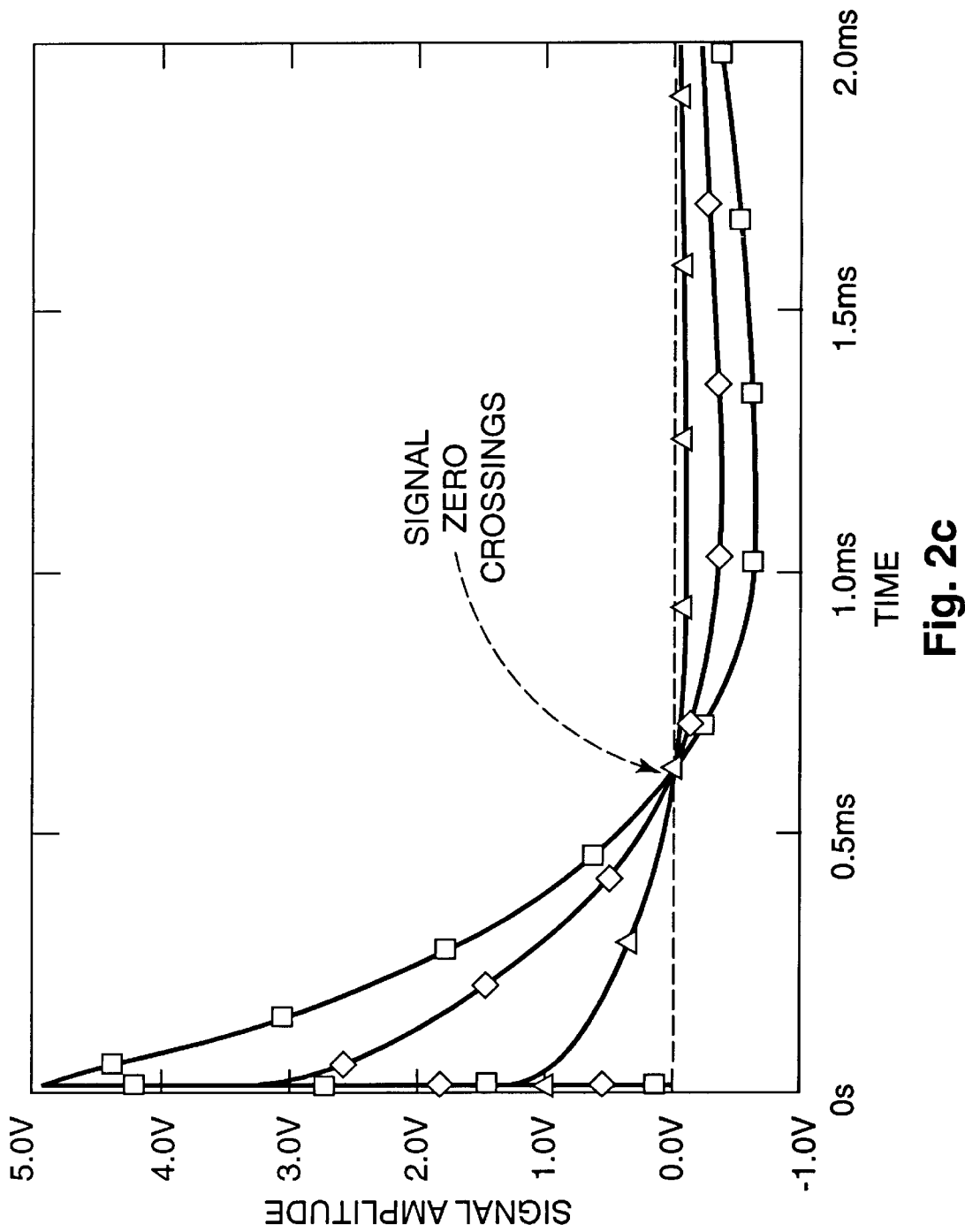
FIG. 2c is a graph showing zero crossings for fixed $\tau_1$ and $\tau_2$ and varying input pulse amplitude.

FIG. 2c graphs the zero crossings for fixed $\tau_1$ and $\tau_2$ and varying input pulse amplitude. It illustrates that the zero crossing point is independent of signal/pulse amplitude in both the buffered and unbuffered cases. This feature makes possible the use of just one high precision component (the fixed frequency timebase 18) in this invention. The timebase 18 is not difficult to embody or maintain, as opposed to two high precision components such as high precision A/D converters, high precision current or voltage sources, or temperature stable power supplies, etc. typical of prior methods. In addition, any gain stages used in our invention are not required to have a precise gain function with temperature.

While the invention has been described with the second time constant varying, it is clear from Equation 1 that either time constant can vary as long as the other is fixed. Any one or all of the elements $C_1$, $R_1$, $C_2$ or resistive element 15 could be temperature dependent and function as the temperature sensor of the invention as long as the circuit designer relates their characteristics to the temperature to be measured.

Returning to FIG. 1, with appropriate selection of the sensor 15, an approximately linear response function can be obtained from the circuit 9. This is understood from Equation 1 where it is seen that the circuit approximately takes the logarithm of the temperature-to-resistance function of the sensor 15. This logarithmic function is generated by the ratios of the two time constants $\tau_1$ and $\tau_2$. If a linear resistive device is used for sensor 15, the result is approximately logarithmic. But if the designer incorporates an approximately correct exponential function into sensor 15, when the logarithm is taken, the result will be an approximately linear function with the temperature of interest. Note too that by careful selection of the fixed components $C_1$, $C_2$, $R_1$, and the resistive sensor 15, a system can be developed that has a nonlinear resolution optimized for a particular application.

Figure 3:
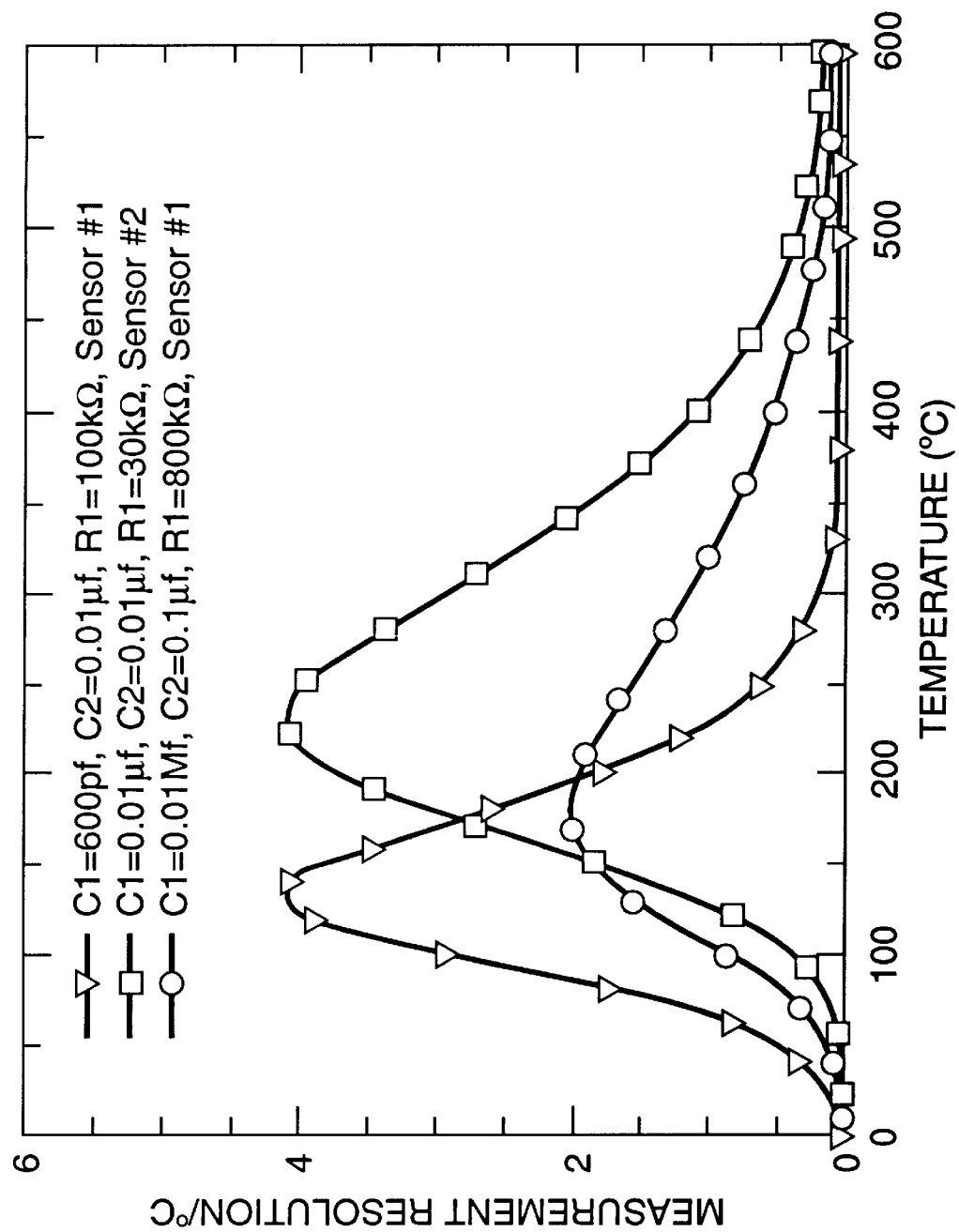
FIG. 3 is a graph showing some example measurement resolutions of the circuit of FIG. 1, each example curve representing unique values of the fixed components of the two time constants of the invention.

FIG. 3 illustrates further variations of the invention. It illustrates that selection of the time constants can be used to tailor the measurement resolution to peak in desired temperature regions. In the circuit of FIG. 1, $R_1$ is temperature stable while the sensor 15 is temperature dependent. This makes the first time constant fixed and the second time constant variable with temperature. However, as described above, the two time constants are interchangeable. The first time constant could vary and the second be fixed. Control is set by the two capacitors $C_1$ and $C_2$, the resistor $R_1$, and by the resistive element 15 selected. A 510k ohm thermistor is used as the resistance-based temperature sensor 15 for all curves shown in FIG. 3. The figure shows some of the optimization possibilities offered by the use of the method. Resolution peak position is also heavily influenced by the sensor 15 reference value.

In addition to the four components discussed above, a resistor can be added in series or parallel with the sensor 15. The additional resistor functions to suppress the temperature measurement range, adding yet another type of resolution or range control. In the case of a thermistor sensor, a parallel resistor compresses the lower portion of the temperature range, while a series resistor compresses the upper portion of the range.

While the step input signal used to trigger the operation of the prototype circuit was a rising edge, it will be clear that a falling edge could be implemented just as well.

The invention is insensitive to the battery supply voltage or power supply voltage to the circuit since it is AC coupled, and because it is a doubly differentiated pulse method based on time crossing, not on amplitude. It is ideal for applications where remote measurements with real time data transmission is needed.

In the case of thermocouple measurement methods, the invention eliminates the need for high gain, temperature-stable amplifiers usually associated with thermocouple measurements. Such amplifiers are known to be sensitive to temperature-related gain and input offset errors.

With proper selection of the timebase frequency and counter width, the invention can provide a medium accuracy temperature measurement at a moderately low cost. The circuit can be made particularly robust for use in harsh environments, miniaturized, and also be battery powered.

The instrument is not limited to the digital output described hereinabove. The n-bit counter could be replaced with some other circuit element that would produce an analog output. An integrator would suffice for the purpose, but would require adding a temperature stable A-D converter following the integrator should a digital result, often needed for calculation purposes, be required.

The circuit hereinabove was described with a resistance-based temperature sensor. It is well known that capacitive sensors traditionally require either an ac measurement or an integrating technique, and cannot be used with the usual circuits designed for resistive sensors. However, as described hereinabove, the circuit of this invention is suitable for use with either resistance-based temperature sensors ($R_1$ or resistive element 15) or capacitance-based temperature sensors ($C_1$ or $C_2$), or both.

While there has been shown and described what are at present considered the preferred embodiments of the invention, it will be obvious to those skilled in the art that various changes and modifications can be made therein without departing from the scope of the inventions defined by the appended claims.

We claim:

1. A method for measuring the temperature of a temperature dependent sensor comprising the steps of:

generating a step signal;

differentiating said step signal with a first time constant means to produce a differentiated pulse, said first time constant means being independent of temperature;

differentiating said differentiated pulse with a second time constant means to produce a doubly-differentiated pulse having a zero crossing, said second time constant means including said temperature dependent sensor;

detecting said zero crossing with a comparator means;

starting a digital counting means at the instant said step signal is generated; and stopping said digital counting means at the instant said zero crossing occurs;

whereby the digital, output of said digital counting means has a known proportionality to the time said digital counting means is started to the time said digital counting means is stopped.

2. The method of claim 1 including the additional step of buffering said differentiated pulse with a buffer means to produce a buffered differentiated pulse.

3. The method of claim 1 wherein said step signal is a voltage.

4. The method of claim 1 wherein said step signal is a current.

5. The method of claim 1 wherein said digital output of said digital counting means is a linear function of temperature.

6. The method of claim 1 wherein said digital output of said digital counting means is a nonlinear function of temperature.

7. The method of claim 1 wherein said temperature dependent sensor is a resistive device.

8. The method of claim 1 wherein said temperature dependent sensor is a capacitive device.

9. A method for measuring the temperature of a temperature dependent sensor comprising the steps of:

generating a step signal;

differentiating said step signal with a first time constant means to produce a differentiated pulse, said first time constant means being dependent on temperature and including said temperature dependent sensor;

differentiating said differentiated pulse with a second time constant means to produce a doubly-differentiated pulse having a zero crossing, said second time constant means being independent of temperature;

detecting said zero crossing with a comparator means;

starting a digital counting means at the instant said step signal is generated; and stopping said digital counting means at the instant said zero crossing occurs;

whereby the digital output of said digital counting means has a known proportionality to the time said digital counting means is started to the time said digital counting means is stopped.

10. An apparatus for measuring the temperature of a temperature dependent sensor comprising:

a means for generating a step input;

a first time constant means independent of temperature for differentiating said step input to produce a differentiated pulse;

a second time constant means dependent on temperature for differentiating said differentiated pulse to produce a doubly-differentiated pulse having a zero crossing, said second time constant means including said temperature dependent sensor;

a comparator means for detecting said zero crossing and providing a stop signal thereupon;

an n-bit counter which begins counting at the instant said step input is generated, and stops counting at the instant said stop signal is received from said comparator means;

a timebase for providing a fixed clock to said n-bit counter; and wherein the digital output of said n-bit counter is a function of the temperature of said temperature dependent sensor.

11. The apparatus of claim 10 further including a buffer means separating said first time constant means and said second time constant means.

12. The apparatus of claim 10 wherein said temperature dependent sensor is a resistive device.

13. The apparatus of claim 10 wherein said temperature dependent sensor is a capacitive device.

14. An apparatus for measuring the temperature of a temperature dependent sensor comprising:

a means for generating a step input;

a first time constant means dependent on temperature for differentiating said step input to produce a differentiated pulse, said first time constant means including said temperature dependent sensor;

a second time constant means independent of temperature for differentiating said differentiated pulse to produce a doubly-differentiated pulse having a zero crossing;

a comparator means for detecting said zero crossing and providing a stop signal thereupon;

an n-bit counter which begins counting at the instant said step input is generated, and stops counting at the instant said stop signal is received from said comparator means;

a timebase for providing a fixed clock to said n-bit counter;

and wherein the digital output of said n-bit counter is a function of the temperature of said temperature dependent sensor.

* * * * *